United States Patent
Orofino, II et al.

(10) Patent No.: US 9,009,690 B1
(45) Date of Patent: *Apr. 14, 2015

(54) CODE GENERATION

(71) Applicant: The MathWorks, Inc., Natick, MA (US)

(72) Inventors: Donald P. Orofino, II, Sudbury, MA (US); Witold R. Jachimczyk, Sutton, MA (US)

(73) Assignee: The MathWorks, Inc., Natick, MA (US)

( * ) Notice: Subject to any disclaimer, the term of this patent is extended or adjusted under 35 U.S.C. 154(b) by 57 days.

This patent is subject to a terminal disclaimer.

(21) Appl. No.: 13/742,231

(22) Filed: Jan. 15, 2013

Related U.S. Application Data

(63) Continuation of application No. 11/841,990, filed on Aug. 20, 2007, now Pat. No. 8,359,586.

(51) Int. Cl.
*G06F 9/45* (2006.01)
*G06F 9/44* (2006.01)

(52) U.S. Cl.
CPC ... *G06F 8/40* (2013.01); *G06F 8/30* (2013.01)

(58) Field of Classification Search
CPC ............ G06F 8/443; G06F 8/441; G06F 8/41
See application file for complete search history.

(56) References Cited

U.S. PATENT DOCUMENTS

| | | | |
|---|---|---|---|
| 5,367,385 A | 11/1994 | Yuan | |
| 5,659,754 A | 8/1997 | Grove et al. | |
| 6,507,947 B1 | 1/2003 | Schreiber et al. | |
| 6,611,956 B1 | 8/2003 | Ogawa et al. | |
| 6,952,821 B2 | 10/2005 | Schreiber | |
| 7,000,213 B2 | 2/2006 | Banerjee et al. | |
| 7,065,263 B2 | 6/2006 | Ueda | |
| 7,185,327 B2 | 2/2007 | Scales | |
| 7,219,328 B2 | 5/2007 | Schloegel et al. | |
| 7,275,242 B2 | 9/2007 | Liu et al. | |
| 7,278,138 B2 | 10/2007 | Kawahito et al. | |
| 7,568,192 B2 | 7/2009 | Mitchell et al. | |

(Continued)

FOREIGN PATENT DOCUMENTS

WO    WO-00/05680 A1    2/2000

OTHER PUBLICATIONS

K. Scott and S. Burleigh; Bundle Protocol Specification; Dec. 2006; retrieved online on Nov. 12, 2014; pp. 1-43; Retrieved from the Internet: <URL: http://tools.ietf.org/html/draft-irtf-dtnrg-bundle-spec-08>.*

(Continued)

*Primary Examiner* — Thuy Dao
*Assistant Examiner* — Hanh T Bui
(74) *Attorney, Agent, or Firm* — Cesari and McKenna, LLP; Michael R. Reinemann

(57) ABSTRACT

In one embodiment, input code is received having a plurality of functional elements that process data elements. At least one criterion for generated code is also received. A first intermediate representation of the input code is built that has a plurality of nodes that represent the functional elements. Block sizes are assigned to two or more nodes of a first intermediate representation. The first intermediate representation is modified to create a second intermediate representation that satisfies the at least one criterion, and organizes at least some of the nodes of the first intermediate representation based on the block sizes.

15 Claims, 17 Drawing Sheets

(56) References Cited

U.S. PATENT DOCUMENTS

| | | | |
|---|---|---|---|
| 7,689,969 | B1 | 3/2010 | Wendling |
| 8,099,726 | B2 | 1/2012 | Harris |
| 2002/0083266 | A1 | 6/2002 | Reuter |
| 2003/0233638 | A1 | 12/2003 | Negishi |
| 2004/0019883 | A1 | 1/2004 | Banerjee et al. |
| 2005/0028143 | A1 | 2/2005 | Aridor et al. |
| 2005/0071827 | A1* | 3/2005 | Lai .............................. 717/146 |
| 2005/0086653 | A1* | 4/2005 | Heishi et al. ................. 717/151 |
| 2005/0102658 | A1* | 5/2005 | Li et al. ........................ 717/140 |
| 2005/0235268 | A1* | 10/2005 | Baldischweiler et al. .... 717/151 |
| 2006/0064670 | A1* | 3/2006 | Linebarger et al. ........... 717/106 |
| 2006/0064680 | A1 | 3/2006 | Devane |
| 2007/0067761 | A1 | 3/2007 | Ogilvie et al. |
| 2007/0169028 | A1* | 7/2007 | Kasten et al. ................. 717/140 |
| 2007/0169030 | A1* | 7/2007 | Tarditi et al. ................. 717/140 |
| 2007/0180440 | A1 | 8/2007 | Pechanek |
| 2008/0028381 | A1 | 1/2008 | Archambault et al. |
| 2011/0154307 | A1 | 6/2011 | Upton |
| 2012/0030660 | A1 | 2/2012 | Mcgrath |

OTHER PUBLICATIONS

Kees Verstoep et al.; Cluster Communication Protocols for Parallel-Programming Systems; ACM Transactions on Computer System, vol. 22, No. 3; Aug. 2004; retrieved online on Nov. 12, 2014; pp. 281-325; Retrieved from the Internet: <URL: http://delivery.acm.org/10.1145/1020000/1012269/p281-verstoep.pdf?>.*

Shifan Chang et al.; Scalable Array Architecture Design for Full Search Block Matching; IEEE; Aug. 1995; retrieved online on Nov. 12, 2014; pp. 332-343; Retrieved from the Internet: <URL: http://ieeexplore.ieee.org/stamp/stamp.jsp?tp=&arnumber=465086>.*

Berndl, Marc and Laurie Hendren, "Dynamic Profiling and Trace Cache Generation," 2003, [online], Retrieved from Internet: <URL: http://ieeexplore.ieee.org/stamp/stamp.jsp?tp=&arnumber=1191552>, retrieved on Sep. 4, 2012, pp. 1-10.

Bhattacharyya, Shuvara S. et al., "APGAN and RPMC: Complementary Heuristics for Translating DSP Block Diagrams into Efficient Software Implementations," The Design Automation for Embedded Systems Journal, vol. 2 No. 1, Jan. 1997, (May 17, 1996), pp. 1-33.

Bhattacharyya, Shuvara S. et al., Converting Graphical DSP Programs into Memory-Constrained Software Prototypes, International Workshop on Rapid Systems Prototyping, Chapel Hill, North Carolina, Jun. 7-9, 1995, pp. 1-31.

Dominguez, Rodrigo, "Dynamic Translation of Runtime Environments for Heterogeneous Computing," Apr. 2012, [online], Retrieved from Internet: <URL: http://www.roddomi.com/pubs/Proposal.pdf>, retrieved on Sep. 4, 2012, pp. 1-62.

"Efficient Image Handling: Tiles," Writing a GIMP Plug-In, Ch. 4, <http://www.gimp.org/docs/plug-in/sect-tiles.html>,2000>, pp. 1-3.

Hammes, J. et al., "High Performance Image Processing on FPGAs," Computer Science Department, Colorado State University, Ft. Collins, CO, Los Alamos Computer Science Institute Symposium, Santa Fe, NM, Oct. 15-18, 2001,pp. 1-10.

Kim, Jungeun and Taewhan Kim, "Memory Access Optimization Through Combined Code Scheduling, Memory Allocation, and Array Binding in Embedded System Design," Jun. 2005, [online], Retrieved from Internet: <URL: http://delivery.acm.org/10.1145/1070000/1 065611 /p1 05-kim.pdf?>, retrieved on Sep. 4, 2012, pp. 105-110.

Patel, Mayur, "A Mamory-Constrained Image—Processing Architecture," Dr. Dobb's Journal, Jul. 22, 2001, http://www.ddj.com/184410228, all pages.

Real-Time Workshop: For Use with Simulink, User's Guide, Version 6, The Math Works Inc., 1994-2005, all pages.

U.S. Appl. No. 10/744,654, filed Dec. 22, 2003, by Houman Zarrinkoub et al., for Block Processing of Input Data in Graphical Programming Environments.

U.S. Appl. No. 11/514,818, filed Sep. 1, 2006, by Paul Costa et al., for Specifying Implementaions of Code Generation From a Model.

Wagner, David B., "Dynamic Programming," Power Programming, The Mathematical Journal, vol. 5 Iss. 4, Miller Freeman Publications, 1995, pp. 42-51.

* cited by examiner

*1300*

STORAGE DECLARATION:

Allocate memory $mem_1$    (16x16 elements)
Allocate memory $mem_2$    (4x4 elements)
Allocate memory $mem_3$    (2x8 elements)
clear $mem_1$, $mem_2$, $mem_3$, $out_1$, $out_2$
for $i_A$ = 1 to 30
    for $j_A$ = 1 to 40
        extract $i_A$, $j_A$ block (16x16) from $in_1$ and copy it to $mem_1$
        apply operation of functional element A to $mem_1$ and place its results in the next unused location of $mem_2$
        if $mem_2$ is filled
            apply operation of functional element B to $mem_2$ and place its results at next unused location of $mem_3$
            clear $mem_2$
            if $mem_3$ is filled
                apply operation of functional element C to $mem_3$ and place its result at next unused location of $out_1$
                clear $mem_3$
            for $i_D$ = 1 to 4
                for $j_D$ = 1 to 4
                    apply operation of functional element D to $i_D$, $j_D$ 4x4 block of $mem_1$ and place its result at next unused location of $out_2$
                end
            end
    end
end

Temporary memory needed to produce output = size(mem$_1$) + size(mem$_2$) + size(mem$_3$) = 16x16 + 4x4 + 2x8 ⏤ 1402
Memory for output buffers = size(out$_1$) + size(out$_2$) = 3x1 + 120x160 ⏤ 1404
Reused memory (savings) = 4x4 block needed by functional element D ⏤ 1406
Number of elements transferred from/to external memory: ⏤ 1408
        30x40 blocks of size 16x16 accessed from in$_1$
        3x1 output elements placed in out$_1$
        120x120 output elements placed in out$_2$

FIG. 14

| BUFFER NUMBER | BUFFER SIZE | NUMBER OF LOOP ITERATIONS | MEMORY ACCESS BANDWIDTH (BUFFER SIZE* ITERATION COUNT) |
|---|---|---|---|
| 1 | 8x8 | 8 | 512 |
| 2 | 16x16 | 4 | 1024 |
| 3 | 4x2 | 2 | 16 |
| 4 | 8x1 | 16 | 128 |
|  | TOTAL: 336 |  | TOTAL: 1680 |

FIG. 15

CODE GENERATION

RELATED APPLICATIONS

This application is a continuation of U.S. patent application Ser. No. 11/841,990 filed on Aug. 20, 2007 by Donald P. Orofino II et al., and entitled "Code Generation", now U.S. Pat. No. 8,359,586, the content of which is hereby incorporated by reference herein in its entirety.

BACKGROUND OF THE INVENTION

Background

Scientists and engineers often create computational systems in order to process large data sets. For example, an image processing program may be created to process image files. FIG. 1 illustrates an example of an image 100 that may be processed by an image processing program or procedure. The image 100 includes a plurality of columns (M), such as column 102, and a plurality of rows (N), such as row 104, whose intersections, such as intersection 106, define cells or records that store data, e.g., one or more pixels. In this example, the image 100 has 1024 columns and 768 rows, and thus has a size of 1024 by 768, or 1024×768. The image 100 may use the (M, N, Z, C) image space model, where M and N represent column and row information, as mentioned above, C represents color information, and Z represents a frame where image 100 is part of a video data stream.

A large memory store, such as main memory, is typically required to process large data sets, such as image files. Providing such large memory stores, however, is typically expensive, consumes processing time, and is not always practical depending on the architecture or the capacity of the computational device that executes the computational system. To reduce memory demands, a computational system and/or device may be configured to operate on portions (e.g., blocks) of the input data structure, rather than operate on the entire input data structure at once. Typically, a computational system and/or device operates over a sequence of blocks of the input data structure, until all blocks that make up the input data structure have been operated upon.

For example, image 100 can be divided into a series of non-overlapping, rectangular blocks, such as blocks 108a-d, each of which is, for example, 8 by 8 pixels in size. An image processing program may be designed to operate on only one block 108 at a time, thereby substantially reducing the memory requirements of the computational system and/or device. Here a block may be brought into memory, processed and then removed from memory. This process may be repeated for each block. When the last block has been processed, the processed blocks may then be re-assembled to produce a processed image. By bringing only a single block into memory, as opposed to the entire image, memory requirements may be reduced.

SUMMARY OF THE INVENTION

In an illustrative embodiment, the present invention relates to a system and method for code generation. The system includes a code generator that receives input code from a developer. The input code may include (1) code that processes a data set, such as an image file, and (2) a plurality of functional elements, such as graphical blocks, statements, commands, modules, scripts, components, etc. The developer specifies one or more criteria for the code being generated from the input code. The specified criteria may be a goal for the generated code, such as minimizing memory requirements, maximizing execution speed, reducing power consumption, etc., or it may be a constraint to be satisfied by the generated code, which is driven by the particular target device, such as a Field Programmable Gate Array (FPGA).

In an embodiment of the invention, the functional elements of the input code are configured with one or more parameters regarding the block sizes, e.g., matrix sizes, that the respective functional element can process. Here, each functional element is configured with at least three such parameters. The first parameter indicates the available block size(s) that the functional element can handle. The second parameter indicates a preferred block size, which is preferably a single block size, and the third parameter indicates a preferred data order, such as row-major or column-major. The preferred block size corresponds to the block size that the respective functional element can process most efficiently, i.e., fastest. The code generator further includes a query engine that queries the functional elements of the input code to obtain their available and preferred block sizes, and preferred data order. The code generator also includes an intermediate representation (IR) builder for generating one or more intermediate representations, such as a graph of connected nodes, from the input code. The code generator also includes an IR customizer that utilizes the block size and data order information obtained from the functional elements to modify, re-organize and schedule the IR graph so as to achieve the specified criteria.

In particular, the IR customizer performs an assessment of the available and preferred block sizes and data orders of the functional elements of the input code. The IR customizer also performs an assessment of the criteria specified by the developer. In the illustrative embodiment, the IR customizer performs a down-selection of optional block sizes in order to arrive at a single block size to use for each functional element. In addition, the IR customizer may group those functional elements that operate on the same size blocks into computational sequences.

The IR customizer may employ heuristic or dynamic programming principles to customize the IR graph to meet the criteria. The IR customizer includes a set of tools, such as a fragmentation inserter, a reassembly inserter, and a loop inserter for inserting fragmentation code, reassembly code and loop code into various locations of the IR graph, respectively. It may also insert instructions to perform padding and/or clipping of the total data set as required to meet looping constraints. The code generator further includes a code generation engine. After grouping, modifying, re-organizing, and schedules ing the IR graph so that it achieves the criteria, the code generation engine produces generated code.

The code generator may also include a report facility. The report facility monitors or receives information regarding the changes and modifications made to the IR graph. The report facility may also produce estimations of the speed, memory usage and other performance characteristics of the final generated code for review by the developer. In addition, a report may be generated to explicitly represent the modifications made by the code generator.

BRIEF DESCRIPTION OF THE DRAWINGS

The invention description below refers to the accompanying drawings, of which:

FIGS. 13, 14 and 15 are illustrate examples of reports produced by the code generator in an embodiment of the invention.

DETAILED DESCRIPTION OF ILLUSTRATIVE EMBODIMENTS

Figure 2:
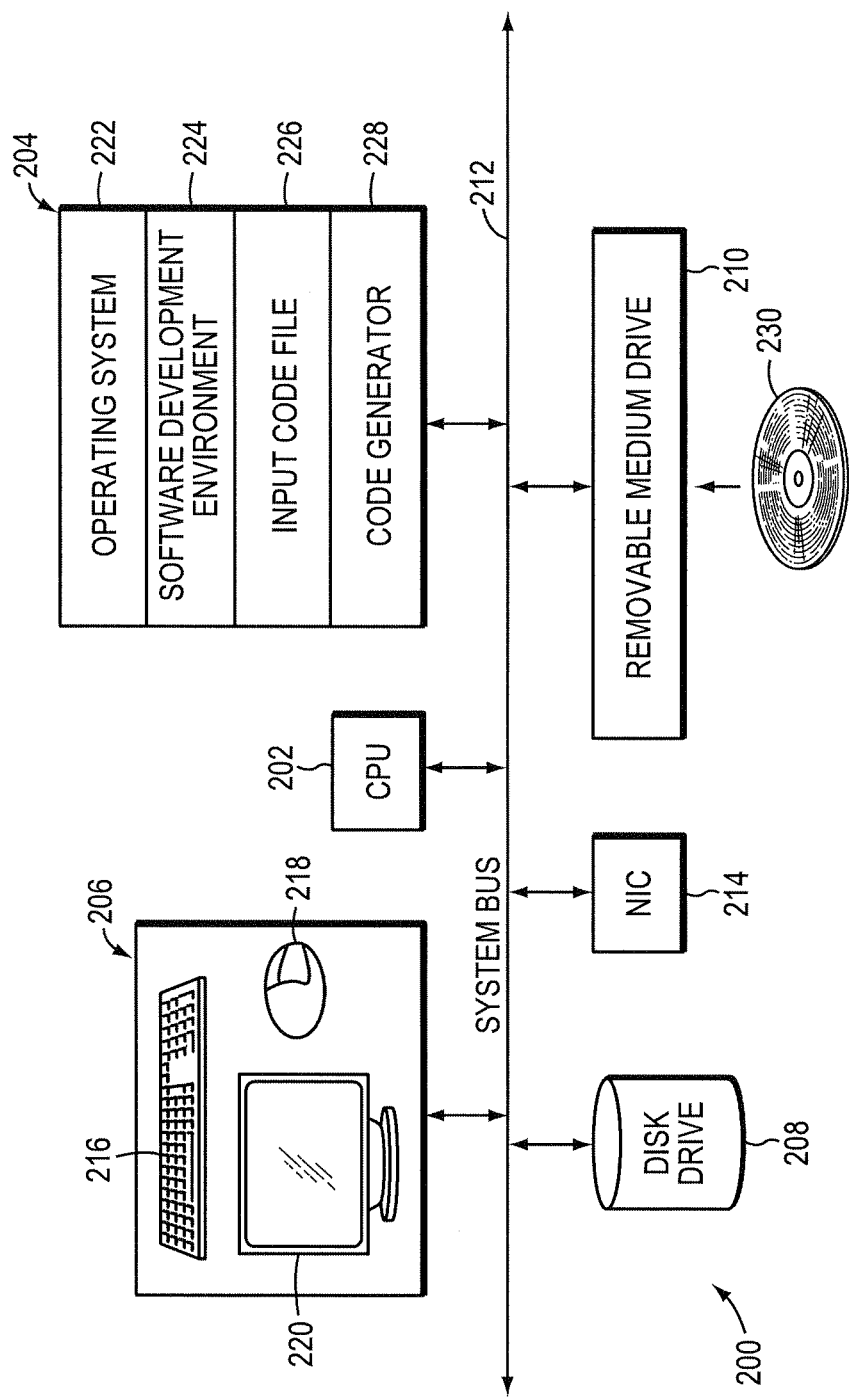
FIG. 2 is a functional diagram of a computational device that may implement an embodiment of the invention.

FIG. 2 is illustrates an example of a computer system 200 that may implement an embodiment of the invention. The computer system 200 includes a central processing unit (CPU) 202, a main memory 204, a user interface 206, a disk drive 208, and a removable medium drive 210 that are interconnected by a system bus 212. The computer system 200 may also include a network interface card (NIC) 214. The user interface 206 includes a keyboard 216, a mouse 218 and a display 220.

The main memory 204 stores a plurality of modules, such as an operating system 222, a software development environment 224, an input code file 226, and a code generator 228 as described in more detail herein.

The removable medium drive 210 is configured to accept and read a computer readable medium 230, such as a CD, DVD, floppy disk, flash memory or other medium. The removable medium drive 210 may further be configured to write to the computer readable medium 230.

Suitable computational devices include personal computers (PCs), workstations, laptops, and palm computers. Nonetheless, those skilled in the art will recognize that other computational devices, such as digital cameras, smart phones, etc. may be used to implement the invention. Suitable operating systems 220 include the Windows series of operating systems from Microsoft Corp. of Redmond, Wash., the Linux operating system, and the UNIX® operating system, among others.

A developer utilizes the keyboard 216, mouse 218 and display 220 of the user interface 206 to operate the software development environment 224 and create the input code file 226.

Suitable software development environments for use with the present invention include the MATLAB® and SIMULINK® technical computing environments from The MathWorks, Inc. of Natick, Mass., the LabVIEW programming system from National Instruments Corp. of Austin, Tex., the Visual Engineering Environment (VEE) from Agilent Technologies, Inc. of Santa Clara, Calif., the Khoros development system now from AccuSoft Corp. of Northborough, Mass., a C programming system, a JAVA programming system, and a C++ programming systems, among others. Those skilled in the art will recognize that the computer system 200 need not include any software development environment at all.

The input code file 226 created by the developer represents a program or procedure designed to process a data set. The data set, moreover, may be arranged or organized as a matrix of data cells, such as an image file having a plurality of pixels. Thus, for example, a data set may be an image file or a video stream, and an input code file 226 may contain input code that corresponds to an image processing procedure that processes the image or video stream. The program or procedure is preferably written in a highlevel language, such as the MATLAB language, the SIMULINK language, C, C++, C#, Java, JavaScript, etc.

Figure 3:
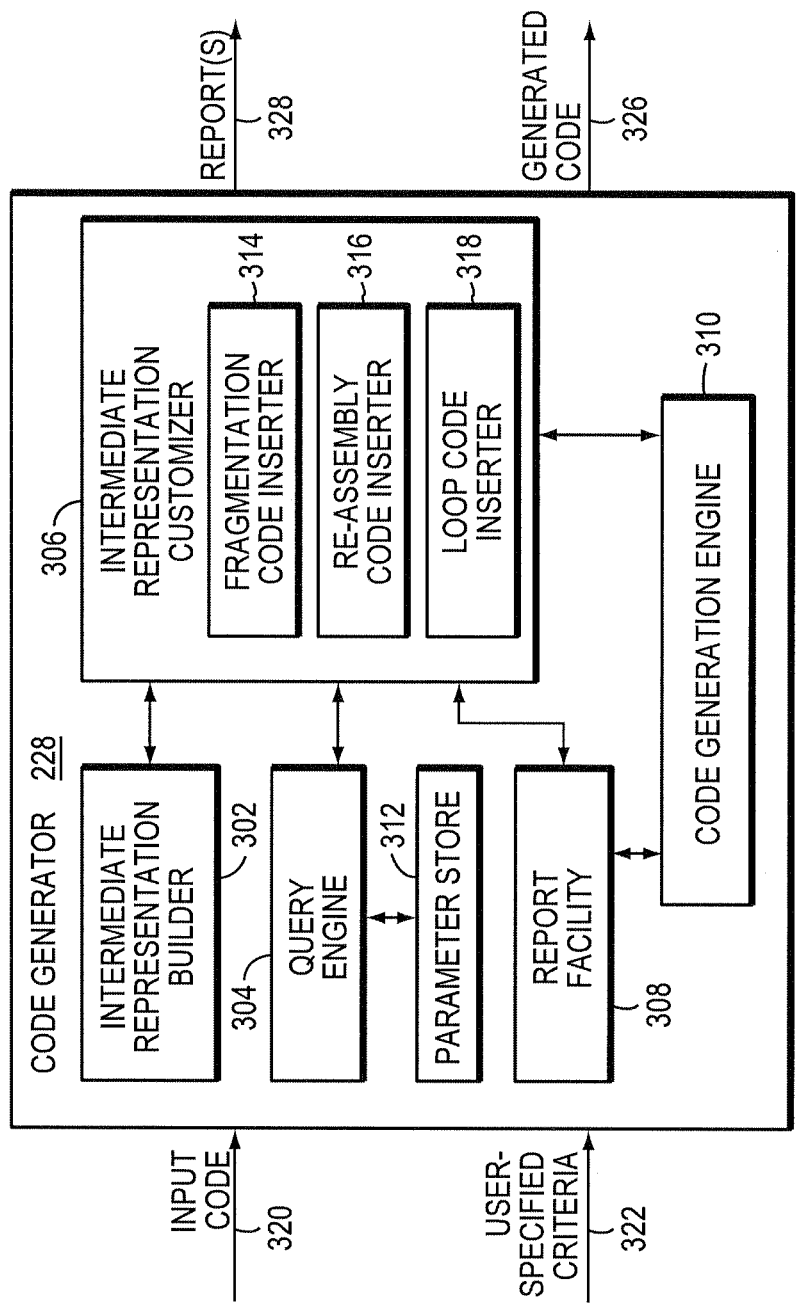
FIG. 3 is illustrates an example of a code generator that may be used in an embodiment of the invention.

FIG. 3 illustrates code generator 228. The code generator 228 includes an intermediate representation (IR) builder 302 that is configured to create one or more IRs from the input code file 226, and a query engine 304 that is configured to query the functional elements of the input code file 226. The code generator 228 further includes an IR customizer 306 that optimizes the IR(s), a report facility 308 that is configured to produce one or more reports, and a code generation engine 310 that is configured to produce generated code. The query engine 304 is coupled to and/or has access to a parameter store 312. The IR customizer 306, moreover, includes a set of tools, such as a fragmentation code inserter 314, a reassembly code inserter 316, and a loop code inserter 318. The code generator 228 receives the input code file 226 created by the developer, as indicated by input arrow 320. The code generator 228 also receives one or more criteria specified by the developer, as indicated by input arrow 322. The code generator 228 produces generated code, as indicated by output arrow 326, and may also produce one or more reports, as indicated by output arrow 328.

It will be understood by those skilled in the art that the IR builder 302, the query engine 304, IR customizer 306, the report facility 308 and the code generation engine 310 may each comprise registers and combinational logic configured and arranged to produce sequential logic circuits. In the illustrated embodiment, the IR builder 302, the query engine 304, IR customizer 306, the report facility 308 and the code generation engine 310 are preferably software modules or libraries containing program instructions pertaining to the methods described herein, that may be stored on computer readable media, such as computer readable medium 230, and executable by one or more processing elements, such as CPU 202. Other computer readable media may also be used to store and execute these program instructions. Nonetheless, those skilled in the art will recognize that various combinations of software and hardware, including firmware, may be utilized to implement the present invention.

In operation, the developer utilizes the software development environment 224 to create the input code file 226. The input code file 226 includes a plurality of functional elements, each of which corresponds to a particular function or operation, or multiple functions or operations. Examples of functional elements may include mathematical, logical, statistical or input/output (I/O) operations, filters, programming constructs or operations, such as IF-THEN-ELSE, etc. The developer may specify the functional elements and their order of execution, if any, either textually, graphically or a combination of textually and graphically, depending on the software development environment 224 being used.

Figure 4:
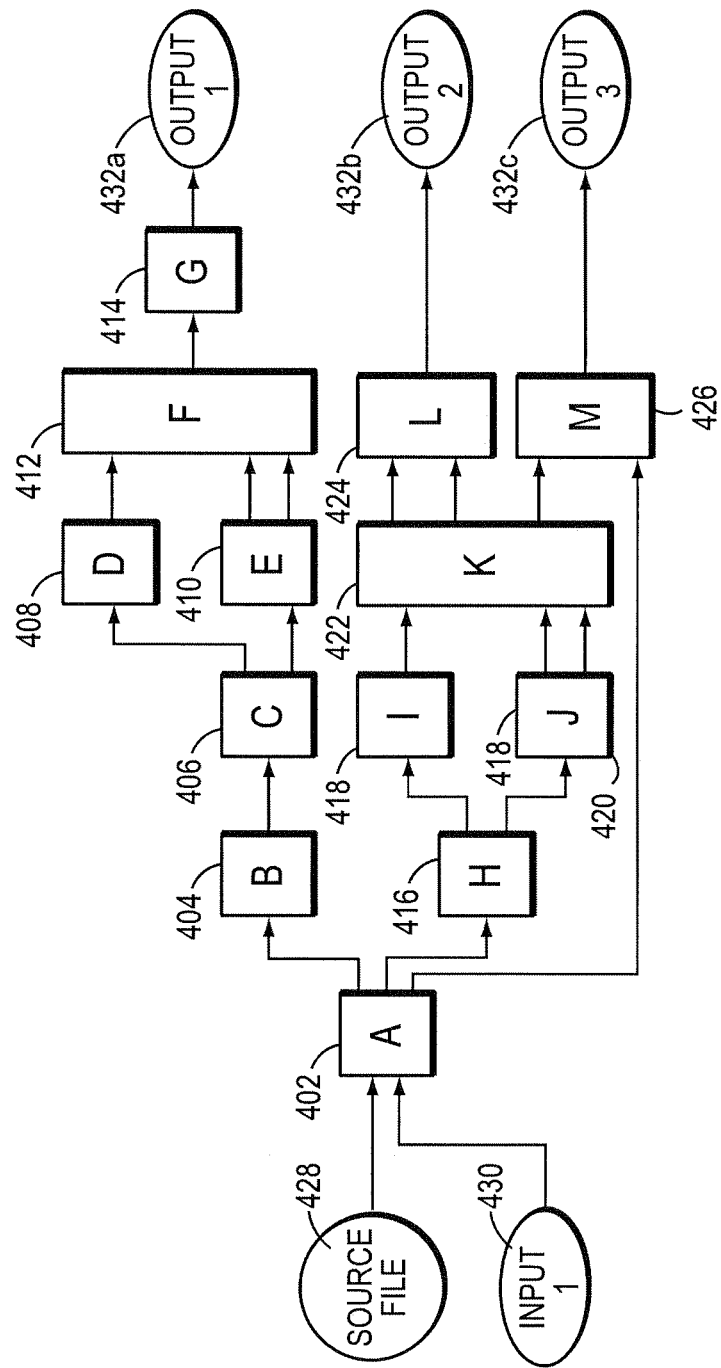
FIG. 4 is an illustrates an example of a graphical model that may be used to represent input code that may be created by a developer.

FIG. 4 illustrates an example of a graphical model 400 that may be used to represent a process corresponding to input code contained in input code file 226. Model 400 includes a plurality of graphical blocks 402-426, each of which corresponds to a particular functional element or elements, that are connected, e.g., "linked" together, by the developer to visually specify the desired procedure. The model 400 further includes a source file node 428 that represents the data set, e.g., the image(s), to be processed by the model 400. In addition, the model 400 includes an input node 430 for receiving an input value, and a plurality of output nodes 432*a*-*c*.

The model 400 of FIG. 4 is meant for illustrative purposes only. Those skilled in the art will recognize that other, e.g., simpler, more complex, or other models, e.g., having different types or arrangements of components, etc., may be created by the developer. For example, in one embodiment, one or more of the graphical blocks may represent a subsystem, which itself comprises a plurality of interconnected icons.

For an input code file specified textually, the functional elements may correspond to commands, subroutines, callbacks, etc. An example of a textual input code file that may be used with an exemplary embodiment is an M-file that is compatible with the MATLAB® technical computing environment.

In an embodiment of the invention, at least some and possibly all of the functional elements of the input code file 226, which are represented by the icons 402-426 of the model 400, are configured programmatically by the creator of the functional element with one or more parameters regarding the block size(s) that can be processed by the respective functional element, and the functional element's data format and/or data organization. In this embodiment, each functional element is configured with at least three parameters. First, each functional element has an available block size parameter. The available block size, which represents the block size(s) of input values that the respective functional element can process, may be a range of block sizes, such as 1 by N to M by N, or 2 by 2 to 64 by 64, where M by N represents M rows and N columns of a data matrix. Second, each functional element may have a preferred (or desired) block size parameter, which represents the preferred input block size for the functional element. The preferred block size may be a single block size, which represents the block size that the respective functional element can process most efficiently, e.g., fastest. Third, each functional block has a data order or organization on which it prefers to operate, such as row-major order or column-major order. If the functional element prefers to operate on rows of data, e.g., scan lines, then it may specify a row-major order preference, e.g., 1 by M. If the functional element prefers to operate on columns of data, then it may specify a column-major order preference, e.g., N by 1. In an embodiment, the block size and data organization parameters may be properties of the corresponding functional elements.

The creator of the functional elements may specify their block size parameters, and preferred data organization or order as part of the functional element. These parameters may be determined by testing, modeling, estimating, simulating, etc., the functional elements. Alternatively or additionally, one or more of these parameters, such as the available and/or preferred block size(s), may be determined automatically by the functional element, based on other parameters of the functional element and/or its environment, including the size of the input data matrix, processing rate, data types, whether the data is real or complex valued, and so on.

Those skilled in the art will recognize that other parameters, such as data type, size, etc. also may be specified for the functional elements.

Figure 1:
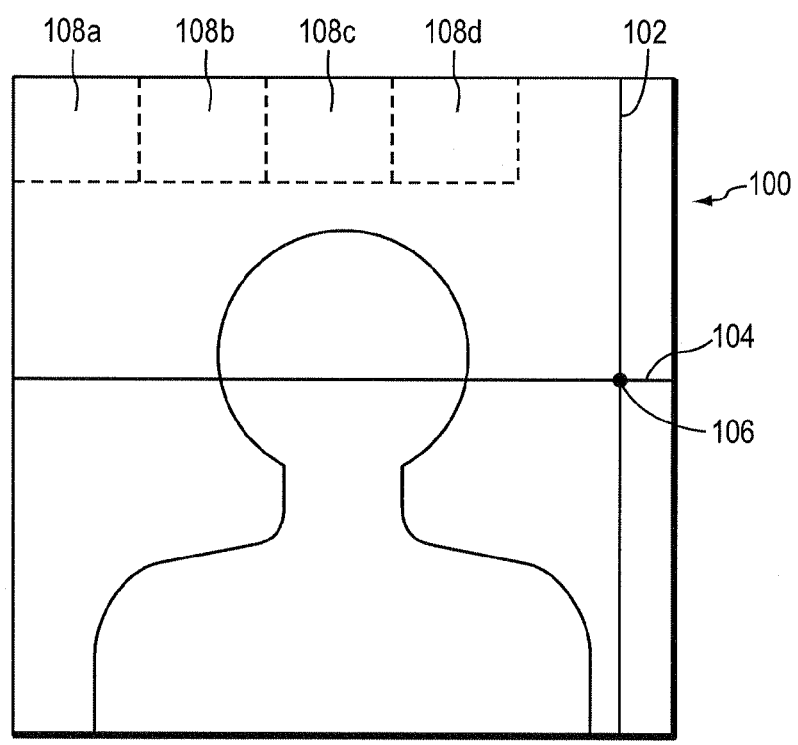
FIG. 1 (previously discussed) illustrates an example of an image that may be processed by an image processing program or procedure.

Not every functional element of a computational system may offer the option of block processing. Some subset of the functional elements of the input code file 226 may participate, while other functional elements may only operate on the entirety of the given input data structure with no opportunity to decompose the input data structure. In other systems, all functional elements may participate. As used herein, the term "block processing" refers to the processing of an input array of data elements over sub-regions of the input array, such as blocks 108*a*-*d* illustrated in FIG. 1, tiles, etc. The sub-regions, moreover, may be non-overlapping or overlapping.

The block sizes of one or more functional elements of the computational system may appear on a dialog, or another interface. The sizes may be interactive parameters that the user can directly enter, or choose from among a set of alternative choices. On the other hand, the block sizes of a functional element may be fully determined by the comaspiler or processing system, and feedback as to the sizes chosen by the code generator 228 may be provided to the user. Finally, a combination of the approaches may be adopted in which a user establishes block sizes for some of the functional elements, and leaves other block sizes to be chosen automatically by the code generator 228 or processing system.

In a further embodiment, the available and preferred block sizes may be programmatically determined by the functional elements, based on one or more compiletime characteristics made available to each functional element during an early stage of code generation. These early stage, compile time characteristics may include the full image/data size to be processed, the data type of individual elements of the image, data complexity, sample rates, etc.

Programming the functional elements to automatically assess and provide block sizes may allow intimate, algorithm-specific decisions to be programmed into the functional element by the creators of the functional elements. In addition, configuring the functional elements with this information simplifies and reduces the knowledge that the code generator itself must have. It also allows the creator of the functional elements to convey, retain and/or maintain the information with the functional elements only.

Figure 5A:
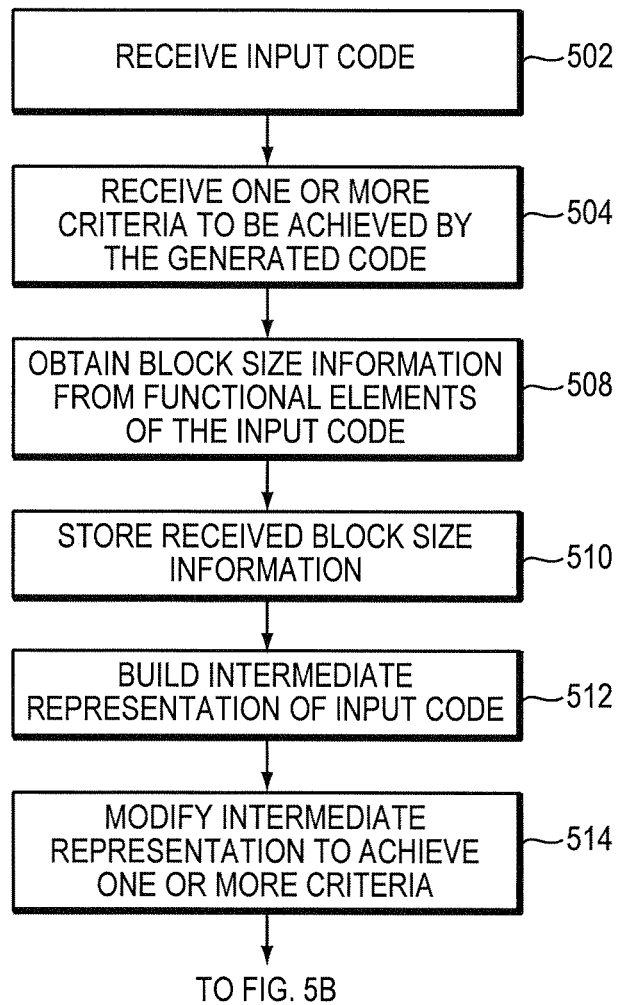
FIG. 5A-B is a flow diagram illustrating example processing that may be used to generate code in an embodiment of the invention.
Figure 5B:
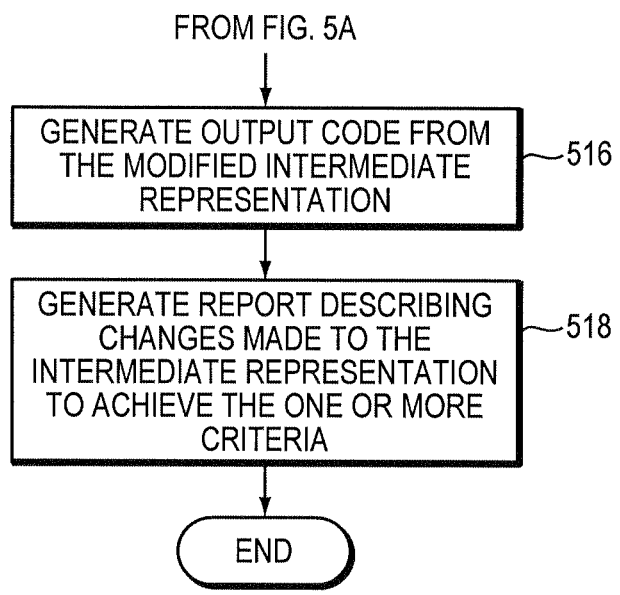

FIGS. 5A-B is a flow diagram of exemplary processing steps that may be used to generate code in an embodiment of the invention. Referring to FIGS. 3 and 5A-B, the code generator 228 receives the input code file 226, as indicated at step 502. The code generator 228 also receives one or more criteria for the generated code as specified by, e.g., the developer, as indicated by step 504. The specified criteria may be a goal or objective for the generated code, or the criteria may be a constraint that must be satisfied by the generated code, e.g., due to some limitation of a target device, such as the number of available gates of an FPGA. The goals or objectives may include, for example, minimizing the memory requirements of the generated code (e.g., minimizing the memory consumed by temporary values, minimizing certain temporary values so that they can fit within the cache of a Digital Signal Processor (DSP), etc), minimizing the number of invocations or replications of one or more functional elements, maximizing the execution speed of the generated code, minimizing the power requirements of the generated code, etc.

Constraints illustratively refer to limitations of a target device on which the generated code is to be implemented. Examples of target devices may include substantially any type of device that performs processing operations, such as but not limited to, a digital or smart camera, a laboratory instrument, factory automation equipment, test equipment, etc. A target device, moreover, may have one or more Digital Signal Processors (DSPs). Furthermore, if the generated code is intended to be run on a DSP, then a relevant characteristic and thus constraint may be the size of the DSP's cache. Another relevant characteristic may be whether the DSP is an 8-bit, 16-bit or 32-bit microprocessor. Yet another relevant characteristic of the target device may be the input/output (I/O) rates, data sizes, power limits, data formats, number of analog to digital (A/D) converters, etc., of the target device or platform.

It should be understood that a developer may specify multiple criteria for the generated code. Furthermore, one or more of the criteria may be derived from higher-level requirements specified for the system utilizing the generated code. For example, the developer may specify that all selected functional elements or just selected functional elements are to be implemented on a particular type of processing element, such as a DSP, an FPGA, a Complex Programmable Logic Device (CPLD), an Application Specific Integrated Circuit (ASIC), etc.

Those skilled in the art will recognize that the code generator 228 may use or rely on different mechanisms or techniques to receive the criteria from the developer. In an embodiment, the software development environment 224 together with the code generator 228 presents the developer with one or more user interfaces (UIs) through which the developer specifies the criteria for the generated code.

Figure 6:
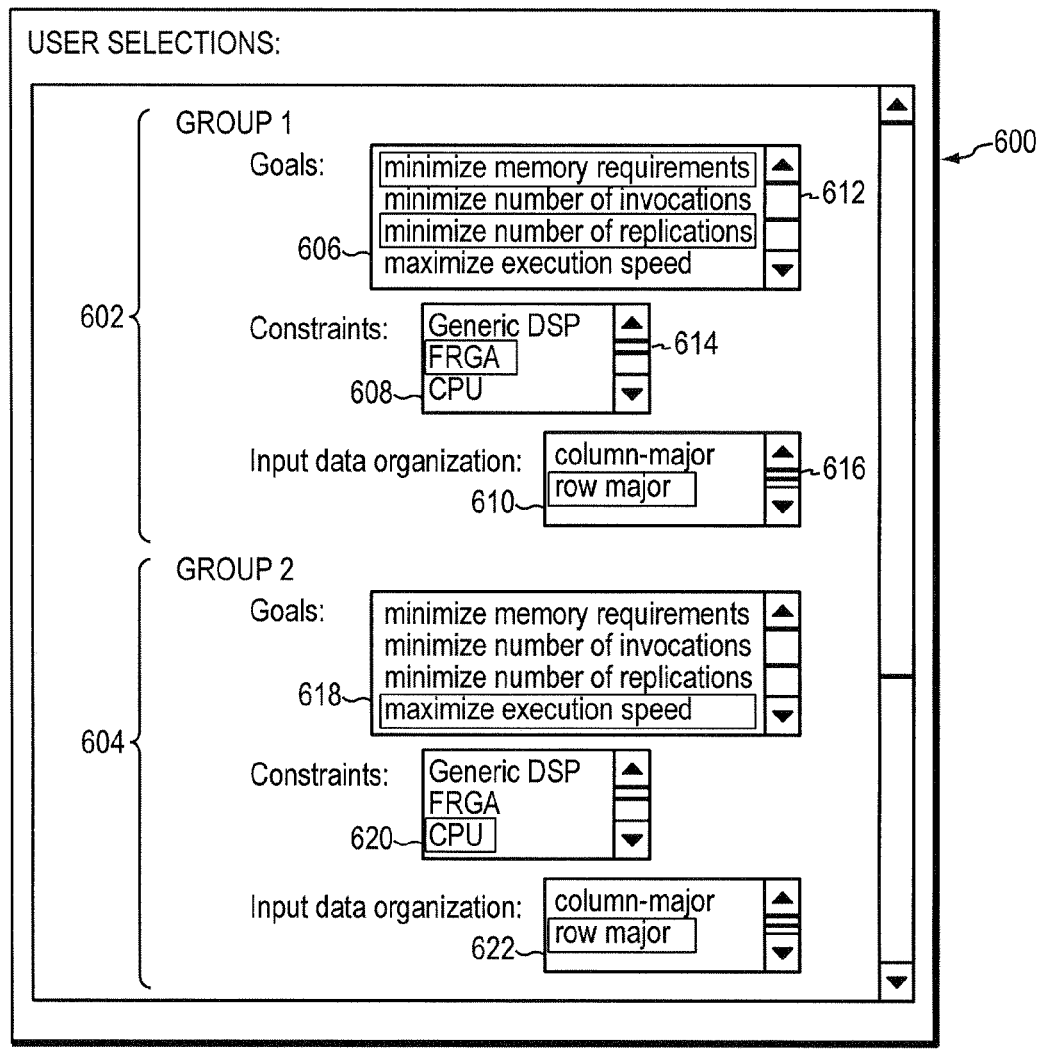
FIGS. 6 and 7 illustrate examples of user interfaces that may be used with the invention.

FIG. 6 is illustrates an example of a user interface 600 that may be presented by the software development environment 224 on the display 220. Suppose that the developer assigns various graphical blocks of model 400 (FIG. 4) into groups. For example, suppose that graphical blocks 404-414 are assigned to a first group, e.g., Group 1, and graphical blocks 416-424 are assigned to a second group, e.g., Group 2. The developer may assign graphical blocks to groups by selecting them, by drawing a border, such as a dashed line, around them, etc. The developer preferably creates the groups based on the criteria to be achieved by the generated code. Specifically, each group may have its own criteria as compared to other groups. User interface 600 has a first area 602 corresponding to Group 1 and a second area 604 corresponding to Group 2. Within first area 602, the User Interface 600 has a first element 606 for specifying one or more goals, a second element 608 for specifying one or more constraints, and a third element 610 for specifying an input data organization.

The first element 606 may be a list of goals that are available for selection by the developer. It may include a vertical scroll bar 612 that may be used by the developer to view all of the available goals. A developer may select one or more goals from first element 606 by highlighting them. As shown in FIG. 6, the developer has selected the "minimize memory requirements" and "minimize number of replications" goals from first element 606. The second element 608 may be a list of the constraints available for selection, and it similarly may include a scroll bar 614. As shown, the developer has selected the "FPGA" constraint, which means that the generated code for the graphical elements of Group 1 is to be run on an FPGA. The third element 610 may be a list of the input data organizations that are available for selection, and it too may have a scroll bar 616. As shown, the developer has selected the "row-major" input data organization for Group 1.

The second area 604 of the user interface 600 similarly includes a first element 618 for specifying one or more goals, a second element 620 for specifying one or more constraints, and a third element 622 for specifying an input data organization. As illustrated, the developer has selected the "maximize execution speed" goal, the "CPU" constraint, and the "row-major" input data organization for icons of Group 2.

Those skilled in the art will understand that other mechanisms or techniques may be used to pass the one or more criteria and input data organization selections to the code generator 228 besides user interface 600.

Referring again to FIGS. 3 and 5A-5B, the query engine 304 queries each of the functional elements of the input code file 226 to obtain the available block sizes, the preferred block size, and the preferred data organization for that functional element, as indicated at step 508. Those skilled in the art will recognize that query engine 304 may be configured in different ways to query the functional elements, and receive their block sizes. For example, the query engine 304 may use a predefined Application Programming Interface (API) to issue one or more calls to the functional elements, which may respond by returning their available and preferred block sizes, such as Get_Available_Block_Sizes( ) and Get_Preferred_Block_Size( ). The arguments of such API calls may be the name and/or path of the functional element, and/or attributes of the input data, such as its size, data type, sample rate, etc. Alternatively, the functional elements, which may be objects in accordance with Object Oriented Programming (OOP) principles, may support one or more execution methods which, if invoked by the query engine 304, returns the available and/or preferred block sizes of the functional element object. The query engine 304 may store the block size information received from the functional elements in the parameter store 312, as indicated at step 510.

Those skilled in the art will recognize that the query engine 304 may be configured to obtain the parameters of the functional elements all at once, or it may be configured to obtain the parameters sequentially or iteratively, as necessary, depending on the criteria specified by the developer. The query engine 304 may also obtain additional or other information, such as the functional elements' preferred traversal order of a data set, its preferred data organization, etc.

The query engine 304 may also be configured to query the hardware on which the code generator 228 in running to obtain constraints that are based on the hardware's characteristics. For example, the query engine 304 may query the hardware elements of computer system 200 (FIG. 2), and determine the speed and bit-size of the CPU 202, the CPU's cache size(s) and the size of main memory 204, among other things. If the code to be generated is not going to be executed on the host machine, characteristics of the target hardware may be made available to the code generator 228 so that it can impose appropriate constraints to generate optimal code for the target hardware. For example, the developer may override or limit the parameters of the functional elements and/or the hardware-based constraints. Suppose the developer is creating and simulating the input code file 226 on a general-purpose computer system, such as a workstation, but intends to target the output code to a cell phone or digital camera. In this case, the developer may override the constraints that the query engine 304 would otherwise obtain by querying the general-purpose computer system on which the developer is working. Similarly, the developer may narrow or limit the range of available block sizes for one or more functional elements, or may specify a zigzag or diagonal based order of an image to be processed, as opposed to a row-based or column-based order.

In an embodiment, the software development environment 224 may display the information obtained from the functional elements to the developer. Specifically, the report facility 308 may collect the obtained information and present the information to the developer through a user interface that is displayed on display 220.

Figure 7:
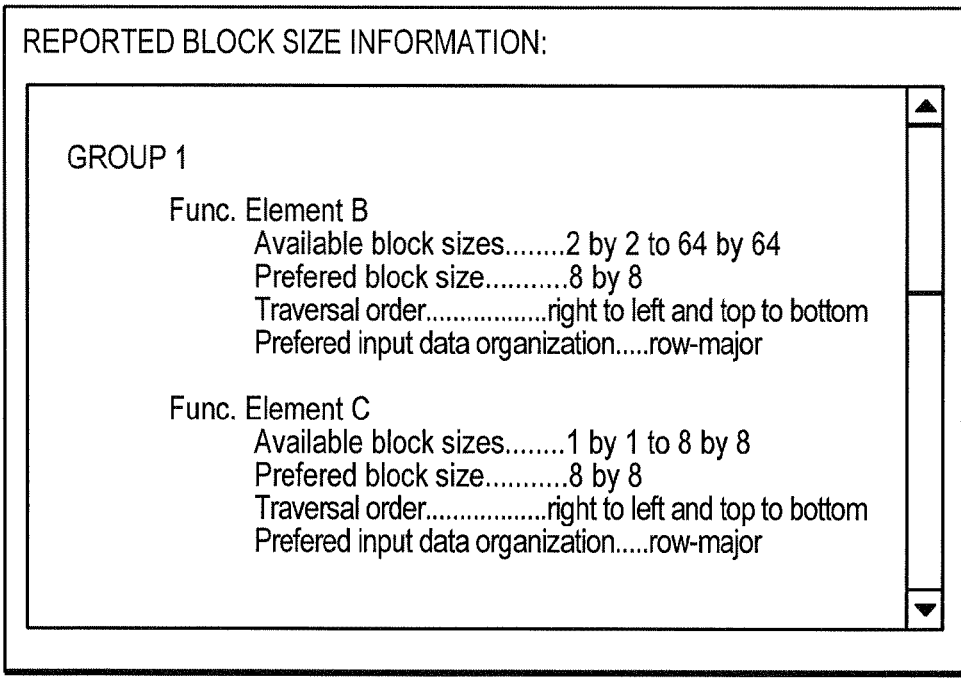

FIG. 7 illustrates an example of a user interface 700 that may be used to present information obtained from functional elements, e.g., graphical blocks, on the display 220. As shown, the user interface 700 presents information obtained from the functional elements, e.g., graphical blocks, of the model 400 (FIG. 4). The information is illustratively presented as a list that is organized by groups and by functional elements within the groups. As shown, the available block sizes for functional element B, which corresponds graphical block 404, are 2 by 2 to 64 by 64. Its preferred block size is 8 by 8. Its traversal order is right to left and top to bottom, and its preferred input data organization is row-major. The available block sizes for functional element C, which corresponds to graphical block 406, are 1 by 1 to 8 by 8. Its preferred block size is also 8 by 8. Its traversal order is right to left and top to bottom, and its preferred input data organization is row-major. By manipulating a vertical scroll bar 702 of the user interface 700, the developer can view information gathered for other functional elements of the model 400.

It should be understood that the information contained in user interface 700 may be presented to the developer prior to the selection of the one or more criteria and the input data organizations.

Referring again to FIGS. 3 and 5A-B, the IR builder 302 of the code generator 228 creates an intermediate representation (IR) from the input code file 228, as indicated at step 512. The IR may be represented as a graph of connected nodes. As understood by those skilled in the art, the IR graph may be a control flow graph, a data flow graph, a control/data flow graph, and/or another type of graph or data representation. A suitable procedure for creating an IR is described in U.S. Patent Publication No. 2006/0064670A1 entitled "Generation of Code from a Graphical Model", which is hereby incorporated by reference in its entirety.

Figure 8:
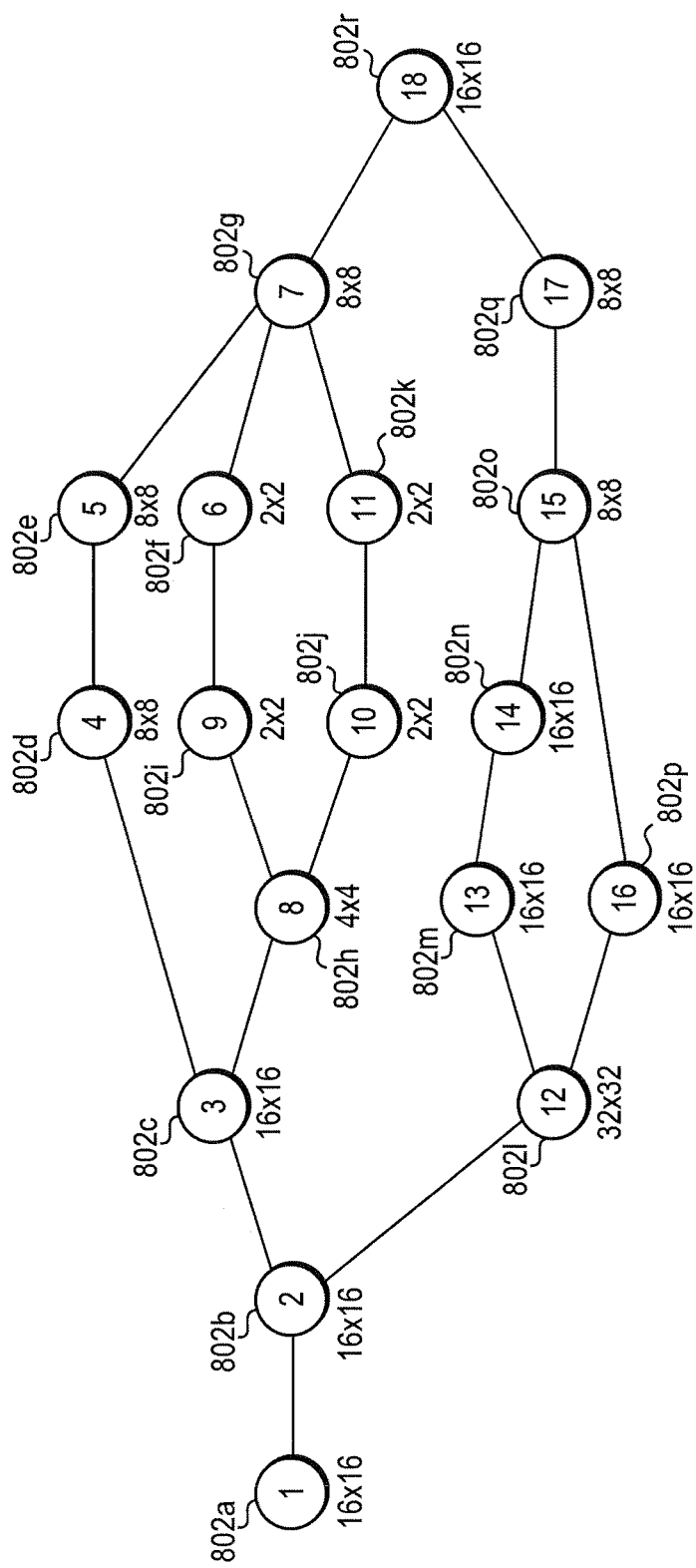
FIGS. 8 and 9 illustrate examples of intermediate representations of the input code of FIG. 4 as modified by the code generator.

FIG. 8 illustrates an example of an IR graph 800 created by the IR builder 302 from the input code file 226. The IR graph 800, which may be a data flow graph, has a plurality of interconnected nodes 802a-r.

Each node 802 of the IR graph 800 typically corresponds to a single functional element of the model 400. However, several nodes, e.g., nodes 802d and 802e, may correspond to the same functional element, e.g., graphical block 406 of the model 400. Thus, for each node 802 of the IR graph 800, the available and the preferred block sizes are known. In FIG. 8, the preferred block size is shown below each node of the IR graph 800. For example, the preferred block size for node 802c is 16 by 16, while the preferred block size for node 802k is 2 by 2. As indicated above, the available and preferred block sizes may be made available to the IR by direct query, by dedicated storage or other means. In an embodiment, the block parameters are retained in the IR graph 800. The criteria and user-specified overrides may also be retained in the IR graph 800.

Referring now to FIGS. 3 and 5A-B, the IR customizer 306 evaluates the IR graph 800, and modifies it to achieve the one or more criteria specified by the developer, as indicated at step 514 (FIG. 5A). For example, suppose that the criterion specified by the developer is to maximize execution speed of the generated code. In this case, the IR customizer chooses the preferred block size for each node. Had the one or more criteria been to minimize memory requirements, the IR customizer may have chosen the smallest block size available by each node.

By evaluating the IR graph 800, the IR customizer 306 discovers that adjacent nodes 802i and 802f, and 802j and 802k all have a preferred block size of 2×2. Accordingly, the IR customizer 306 preferably groups these four nodes of the IR graph 800 together. Furthermore, as the upstream node 802h has a preferred block size of 4 by 4, the fragmentation code inserter 314 preferably inserts fragmentation code after node 802h to divide the blocks being output by node 802h from a block size of 4×4 into a block size of 2 by 2 for processing by nodes 802i, 802f, 802j and 802k. As downstream node 802g has a preferred block size of 8 by 8, the re-assembly code inserter 316 preferably inserts re-assembly code ahead of node 802g that converts the blocks being output from nodes 802f and 802k from a block size of 2×2 to a block size of 8×8 for processing by node 802g. In addition, the loop code inserter 318 may place a loop, such as a "FOR" loop, around nodes 802i, 802f, 802j and 802k so that they are repeated 16 times to produce an 8×8 block size for use by node 802g.

This process of evaluating the available and preferred block sizes of the nodes and organizing the nodes into groups having the same preferred block size is repeated throughout the IR graph 800 by the IR customizer 306. The result is an IR graph that maximizes execution speed.

It should also be understood that the IR customizer may determine that by grouping those nodes of the IR graph that share the same preferred block size, e.g., 4×4, the IR customizer can further increase the execution speed of the generated code by applying an optimization, such as loop fusion where these nodes are placed within a single, common "FOR" loop.

In an embodiment, the IR customizer 306 uses heuristic or dynamic programming based algorithms to evaluate and modify the IR graph 800 to achieve the one or more criteria specified by the developer. For example, a cost may be associated with each of the nodes and/or the paths between nodes of the IR graph 800. These costs, moreover, may be a function of the preferred and/or available block sizes for the functional elements cores responding to the respective nodes. The IR customizer 306 builds a model, such as a matrix of points, using these costs. The IR customizer 306 then determines a path through this model that satisfies the one or more criteria specified by the developer.

Examples of suitable dynamic programming algorithms for use with the invention are described in R. Bellman *Dynamic Programming* (2003), and suitable heuristic programming methods are described in D. Levy et al., "Heuristic Programming in Artificial Intelligence: The First Computer Olympiad" (1989). Other known algorithms that may be advantageously applied to the invention include Pairwise Grouping of Adjacent Nodes (PGAN), Acyclic PGAN (APGAN), Recursive Partitioning Based on Minimum Cuts (RPMC), and Multi-Dimensional Statically Schedulable Data Flow (MDSSDF). These algorithms are examples of dataflow schedule computation algorithms that are based on principles of dynamic programming.

It should be understood that the IR builder 302 may perform any number of transforms on the IR graph 800 to produce other IR representations. For example, the IR builder 302 may perform lowering transforms, elaboration transforms, or optimization transforms, as part of its processing of the input code. At least one of the IRs, moreover, may provide non-language specific, primitive constructs that may be used to generate code in many different languages or formats, such as C, C++, C#, Java, JavaScript, VHDL, Verilog, etc. Furthermore, the evaluation and modification performed by the IR customizer 306 may start on any of these different IR representations.

Figure 9:
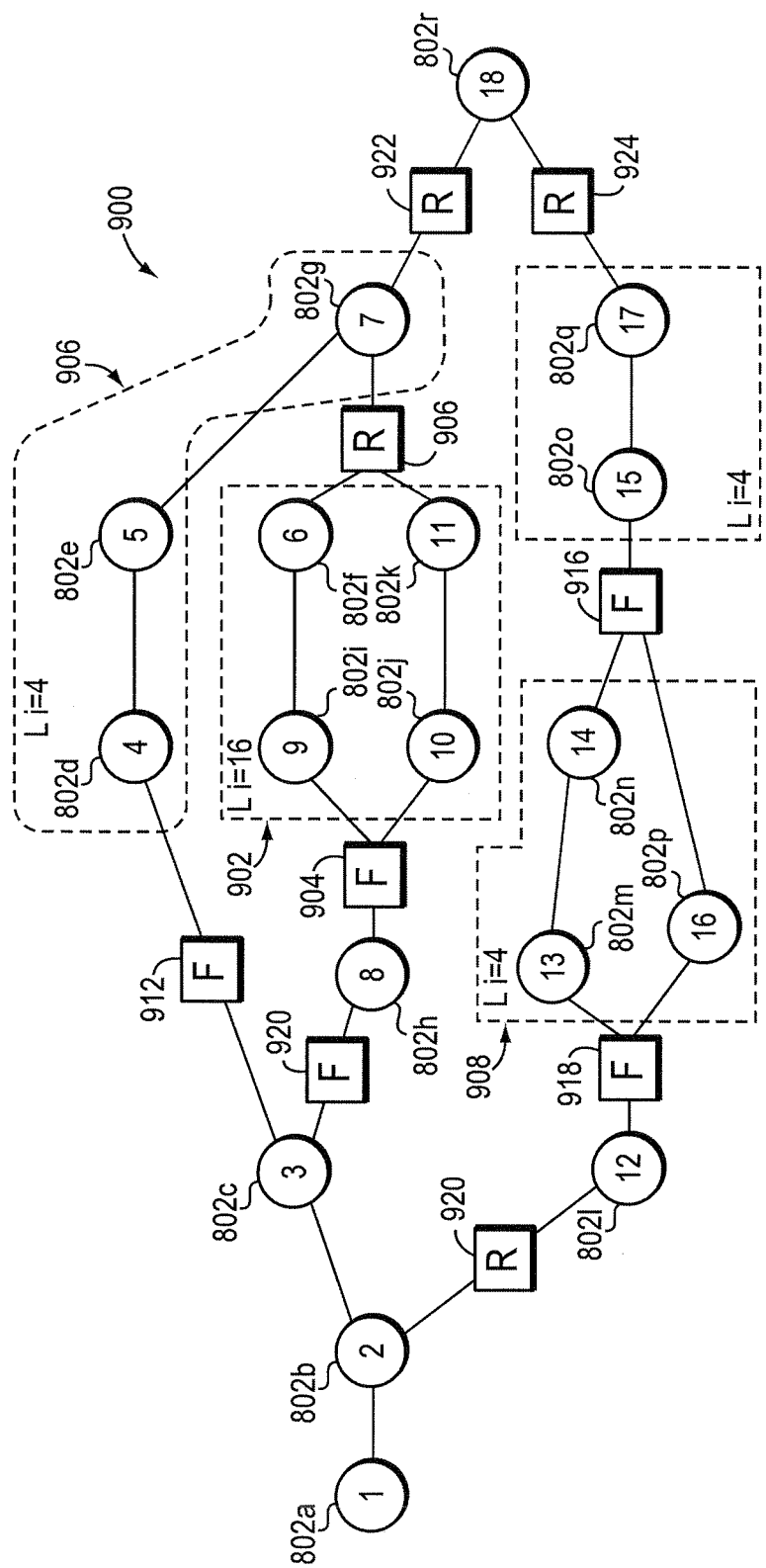

FIG. 9 illustrates an example of an optimized IR graph 900 following the processing of IR graph 800 by the IR customizer 306. Nodes 802i, 802f, 802j and 802k are placed in a Loop structure (L) 902 that has a loop count (i) of 16. In addition, fragmentation code (F) 904 and reassembly code (R) 906 are inserted ahead and behind these nodes respectively. As shown, nodes 802d, 802e and 802g, which each have a preferred block size of 8×8, are placed in Loop structure 906. Nodes 802m, 802n and 802p, which each have a preferred block size of 16×16, are placed in Loop structure 908, and nodes 802o and 802q are placed in Loop structure 910. Furthermore, fragmentation code elements 912-918 are inserted before 802d, 802h, and 802o and after node 802l, respectively. In addition, reassembly code elements 920-924 are inserted after nodes 802b 802g and 802q, respectively. By grouping these various sets of nodes together, placing them in loop structures, and adding fragmentation and reassembly code, the IR customizer 306 maximizes execution speed of the code to be generated from the input code file 226.

By applying fragmentation and reassembly, adjacent IR graph nodes representing functional elements (or groups of functional elements) that process dissimilar block sizes nonetheless may be selected for grouping. In particular, the larger block size, utilized by a first functional element(s), may be subdivided or fragmented into sub-blocks whose size equals the smaller block size, utilized by a second functional element(s). Each subblock of the larger block is visited, sequentially or in parallel, and presented to the second functional element that takes the smaller block for processing. An order of visitation of sub-blocks is determined, preferably in response to the requirements of preceding and/or subsequent computations, and by constraints of the system, such as memory organization, cache characteristics, etc. The result of each computation on the smaller block is retained in a reassembly-storage area. In this way, the second functional element(s) operating on the smaller block size can produce an output the same size as the larger block processed by the first functional element(s).

Figure 10A:
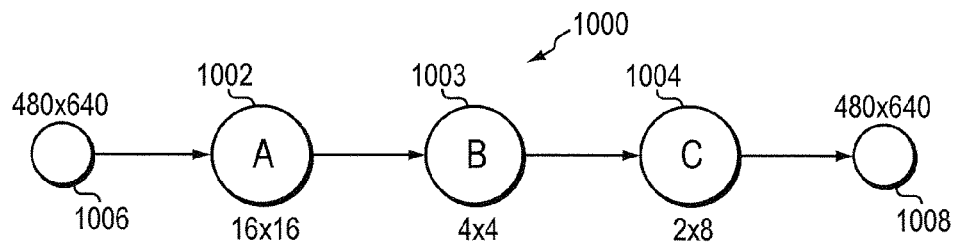
FIGS. 10A-C and 12 illustrate examples of graphs.
Figure 10B:
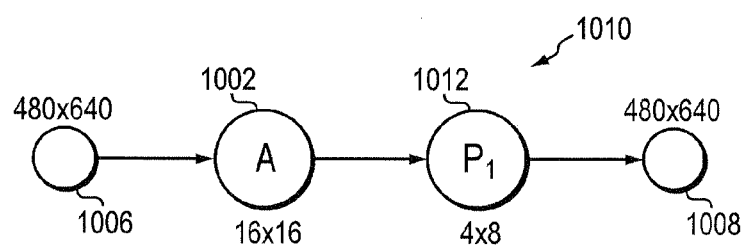
Figure 10C:
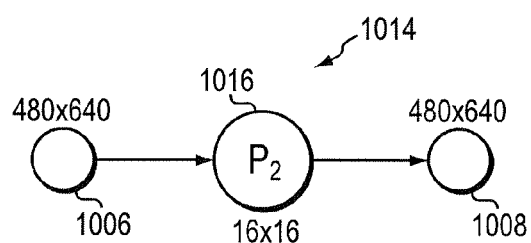

FIGS. 10A-C illustrate iterations of an exemplary IR graph 1000 of a multi-node computational system. As shown in FIG. 10A, the IR graph 1000 has three nodes 1002, 1003 and 1004 which are also designated as nodes A, B, and C, respectively. Additionally, the IR graph 1000 receives an input data structure 1006, and produces an output data structure 1008. As shown, node 1002 (node A) utilizes a block size with 16 vertical by 16 horizontal matrix elements, or 16 rows by 16 columns, referred to as a 16×16 block size. Node 1003 (node B) utilizes a 4×4 block size, and node 1004 (node C) utilizes an 8×8 block size. The input data structure 1006, and the output data structure are both matrices of 480×640 elements.

The graph 1000, which comprises nodes A, B, and C, has a block processing size equal to a two-dimensional (2-D) least common multiple (LCM) of the block sizes of the individual nodes. In the vertical dimension, this is LCM(16,4,2) or 16. For the horizontal dimension, this is LCM(16,4,8) or 16. The LCM is computed individually for each dimension, and this may be denoted by the shorthand notation LCM(length, height). Thus, the block size for the system 1000 is 16×16. The number of tiles, or the number of times sub-blocks of the block size are accessed, in order to consume a full input matrix, is found by dividing the 480×640 source size by the 16×16 system block size. This leads to 1200 block memory accesses, forming a grid of 30×40 blocks.

The order of processing of the 1200 blocks within the full source matrix may be application dependent, and may be selected based on architectural factors of the target device. For example, a first application may process the blocks in rows, while a second application may process them in columns, etc.

A scheduling algorithm is selected to schedule this graph 1000 of two-dimensional (2-D) nodes 1002-1004 for execution. In an embodiment, a novel variation of the pair-wise grouping of adjacent nodes (PGAN) algorithm is selected. PGAN as it stands may be used to schedule one-dimensional (1-D) synchronous dataflow graphs, however, it does not schedule graphs of 2-D nodes, does not decompose the data input to the node as a group of blocks or tiles, and does not accommodate 2-D ordered visitation of blocks in that decomposition. The PGAN algorithm, however, may be modified as described herein to perform these functions.

As mentioned above, those skilled in the art will understand that other scheduling algorithms, besides the modified PGAN scheduling algorithm described herein, may be selected.

Pairs of nodes that are topologically connected, and that lead to a consistent two-node schedule are preferably grouped together. For example, nodes 1003 and 1004 (nodes B and C) have preferred block sizes of 4×4 and 2×8, respectively. In accordance with the method of the present invention, these two nodes 1002 and 1003 are analyzed to determine an execution schedule.

Figure 11A:
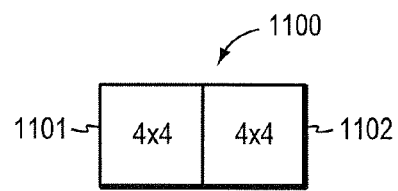
FIGS. 11A-D illustrate examples of block sizes.

Node 1003 (node B) must be executed twice to process a sufficient number of blocks to execute node 1004 (node C) twice. Moreover, the two 4×4 blocks input to node 1003 (node B) cannot be arbitrarily selected. Instead, the two executions of node 1003 (node B) must form a contiguous 4×8 block from the input data so that node 1004 (node C) can be properly executed. Accordingly, the data input to node 1003 (node B) must be fragmented into 4×4 blocks, and it must be done so in two adjacent horizontal blocks. The resulting 4×8 block must form a 1×2 tiling of 4×4 blocks. FIG. 11A illustrates the output data 1100 of node 1003 (node (B), which comprises two adjacent, horizontal 4×4 blocks 1101, 1102. This execution schedule for node 1003 (node B) may be denoted as (1,2)B.

Figure 11B:
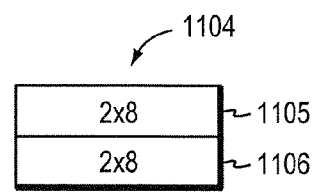

Node 1004 (node C) may then be executed on the reassembled 4×8 output data 1100 of node 1003 (node B). The execution schedule for node 1004 (node C) may be denoted as (2,1)C, specifying a fragmentation of the 4×8 input block into two vertical and one horizontal adjacent blocks of size 2×8. These blocks are then executed upon by node 1004 (node C). As indicated above, this execution schedule is denoted by (2,1)C. FIG. 11B illustrates the input data 1104 of node 1004 (node C), which comprises two adjacent, horizontal 2×8 blocks 1105, 1106.

Taken as a pair, the scheduling for execution of nodes 1003 and 1004 (i.e., nodes B and C, respectively) may be denoted as (1,2)B(2,1)C. A new IR graph 1010 (FIG. 10B) is created in which the two nodes 1003, 1004 may be joined together to form a new replacement node 1012 (node $P_1$). The new replacement node 1012 (node, $P_1$) replaces the pair-wise grouping of adjacent nodes 1003 and 1004 (nodes B,C). The replacement node 1012 (node $P_1$), moreover, has a block size LCM(B,C) of 4×8.

The process of pair-wise grouping of nodes as described above for nodes 1003 and 1004 (nodes B and C) is repeated for adjacent nodes 1002 and 1012 (nodes A and $P_1$). Nodes 1002 and 1012 (nodes A and $P_1$) have preferred block sizes of 16×16 and 4×8, respectively. Accordingly, for each execution of 1002 (node A), node 1012 (node $P_1$) is executed eight times. That is, the 16×16 block of output data of node 1002 (node A) must be fragmented into eight 4×8 blocks. Specifically, the 16×16 output block is fragmented into four vertical and two horizontal 4×8 blocks for processing by node 1012 (node $P_1$).

Figure 11C:
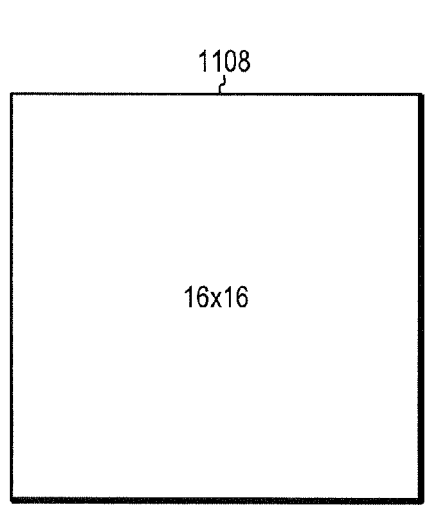
Figure 11D:
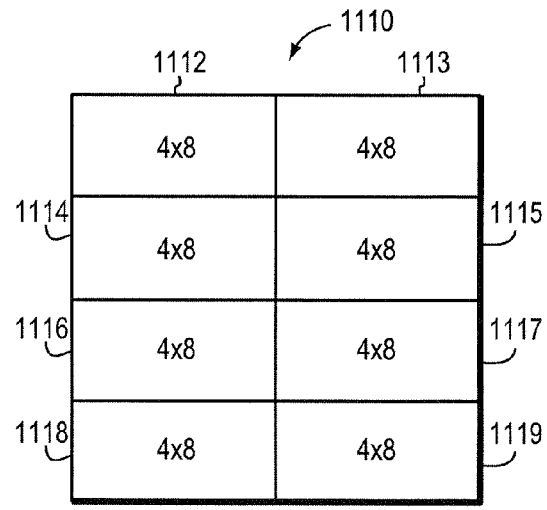

FIG. 11C illustrates the output data 1108 of node 1002 (node A), which is a 16×16 block. FIG. 11D illustrates the input data 1110 for node 1012 (node $P_1$), which is eight 4×8 blocks 1112-1119 organized into four rows and two columns Taken as a pair, the scheduling for execution of nodes 1002 and 1012 (nodes A and $P_1$) may be denoted as A (4,2)$P_1$. A new IR graph 1014 (FIG. 10C) is created in which the two nodes 1002 and 1012 (nodes A and $P_1$) are collapsed together to form another new node 1016 (node $P_2$). The block size of node 1016 (node $P_2$) is LCM(A, $P_1$) or (16,16). As mentioned above and as illustrated in FIGS. 11C and 11D, node 1002 (node A) executes once, and node 1012 (node $P_1$) executes eight times—four blocks vertically by two blocks horizontally. The traversal order of the 16×16 output block to obtain the eight 4×8 input blocks for node 1012 (node $P_1$) can be selected to fulfill architectural constraints, such as row-major or column-major data ordering, cache fill orientation, etc. In any event, the eight 4×8 output blocks of node 1012 (node $P_1$) may be reassembled to form a 4×2 grid of 4×8 blocks to form a 16×16 result.

At this point, only one node 1016 (node $P_2$) remains, and the operating of the scheduling process terminates. The complete schedule for original nodes 1002-1004 (nodes A-C) may be reconstructed by back-tracking through all the sub-schedules of the pair-wise groups, collecting them together as follows:

$P_2 = A (4,2) P_1$ $A (4,2)((1,2) B (2,1) C)$

To implement the final execution schedule, it may be read "inside-out", using algebraic rules for interpreting the precedence of the parentheses. That is, execution of the functional element(s) represented by node 1003 (node B) is looped twice, executing the functional element(s) on two data blocks that are contiguous in the same row of the source data matrix. Recall that node 1003 (node B) performs a 4×4 block computation, which produces a 4×8 data block from its two scheduled executions. The input to node 1003 (node B) is 16×16.

This 4×8 data block is a transitive result and is stored in a memory buffer allocated for this purpose. It should be understood that this buffer may be used to store other transitive results needed elsewhere in the execution of the system when the output of node B is no longer need.

Then, the functional element(s) represented by node 1004 (node C) executes twice on two data blocks that are contiguous in the same column of the source data matrix. The source of data for the functional element(s) of node 1004 (node C) is, of course, the output of the functional element(s) for node 1002 (node B), which as described above is 4×8. This follows as the functional element(s) for node 1004 (node C) process 2×8 block sizes, and two such blocks exist in the output of the functional element(s) of node 1003 (node B) after it has finished both of its iterations.

The final block size, 16×16, was predicted by the LCM computed across all original block sizes. The fragmentation of the input data of size 480×640 must be performed to provide 16×16 blocks to node 1016 (node $P_2$). Also, reassembly of the output blocks from node 1016 (node $P_2$) must also be performed to reconstruct the 480×640 output data.

Once the IR graph has been modified so as to achieve the one or more criteria, the code generation engine 310 generates code from the modified IR graph, as indicated at step 516. The generated code is output by the code generator 228, as indicated by arrow 326, and made available to the developer.

The generated code may be source code, object code, a compiled executable, a library forming an executable of a model, or any other form of executable instructions. The generated code may also be a hardware description language, net list or bit stream for configuring a programmable hardware element.

As indicated above, the code may correspond to any language or format suitable for use on a programmable software or hardware element. It may be an intermediate language, such as C, C++, VHDL, Verilog, etc., which itself may be compiled into a form that can be executed directly on a processor, or synthesized into a final bit stream suitable for configuring the gates of a programmable hardware element, such as an FPGA. The developer may load the generated code or a compiled or synthesized derivative of it onto selected processing hardware, and execute it to perform the procedure(s) for which the input code 226 was created.

In addition, in a preferred embodiment, the report facility 308 generates a report that describes the modifications that have been made to achieve the one or more criteria. This report, which may take the form of a text file, is also output by the code generator 228, as indicated by step 518 and by arrow 328, and made available to the developer for review. At this point, processing is complete, as indicated by end terminal 520.

Figure 12:
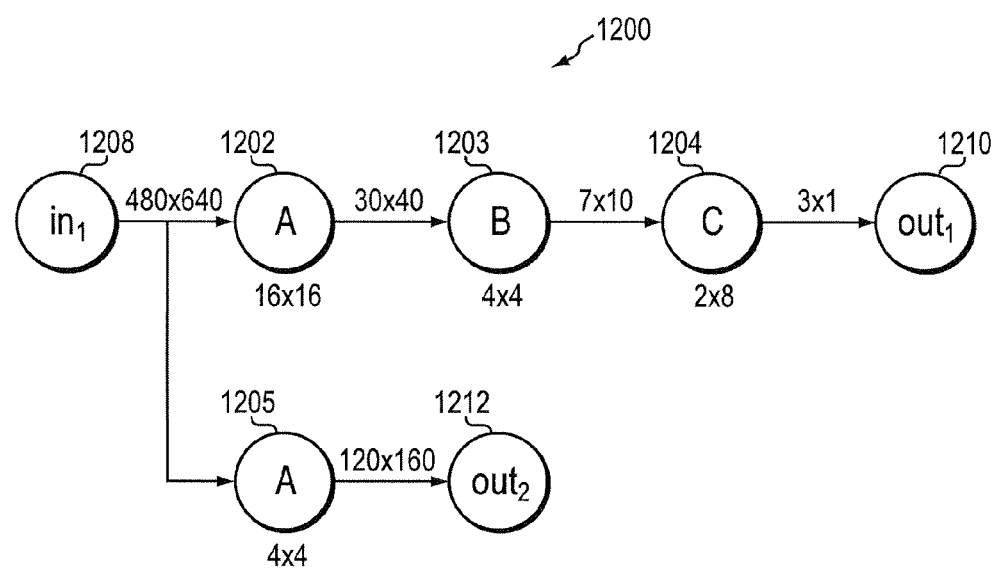

FIG. 12 illustrates an example of an IR graph 1200 of a multi-node computational system for which one or more reports may be generated. The IR graph 1200 has four nodes 1202-1205 also designated as nodes A, B, C, and D, respectively. Additionally, the IR graph 1200 receives an input data structure 1208 also designated as $in_1$, and produces two output structures 1210 and 1212 also designated as $out_1$ and $out_2$, respectively. As shown, node 1202 (node A) uses a block size of 16×16, node 1203 (node B) uses a block size of 4×4, node 1204 (node C) uses a block size of 2×8, and node 1205 (node D) uses a block size of 4×4. The input data structure 1202 ($in_1$) is a 480×640 matrix of elements. The first output data structure 1210 ($out_1$) is a 3×1 matrix of elements, and the second output data structure 1212 ($out_2$) is a 120×160 matrix of elements.

Graphs used with the illustrative embodiments may be configured to satisfy one or more requirements, assumptions, objectives, etc. For example, the graph 1200 satisfies the following assumptions:

1) the block sizes selected by each of the nodes/functional elements for processing are non-overlapping;

2) the computation applied to each block produces a scalar result, e.g., of size 1×1; and 3) edge effects may be ignored, e.g., node 1204 (node C) produces an output of size 3×1 even though the height of two data elements fits into seven more than three times.

As in the prior example, the transformation produces an implementation that fits the block preferences/constraints reported by each functional element, and the constraints specified by the user.

FIG. 13 illustrates an example of a report 1300 produced by the report generator 308 for the IR graph 1200. Report 1300 provides an indication of the storage declarations for the IR graph 1200. As shown, the report 1300 is presented in the form of pseudo-code. Those skilled in the art will recognize that the information of report 1300 may be presented in a number of ways, e.g., according to a determined format. The report generator 308, moreover, may have access to, and may make use of one or more report templates.

FIG. 14 illustrates an example of another report 1400 produced by the report generator 308 for the IR graph 1200. Report 1400 provides an indication of various memory requirements of the system of the computational system of IR graph 1200, such as the temporary memory needed to produce the output 1402, the memory for output buffers 1404, the reused memory 1406, and the number of elements transferred from/to external memory 1408.

Depending on the information contained in the reports 1300, 1400, the developer may decide to repeat the code generation process, changing the one or more criteria. If the IR customizer 306 is unable to modify the IR graph 800 in such a way as to achieve the one or more criteria specified by the developer, this failure, and the modifications that were tried, may be reflected in the reports 1300, 1400.

FIG. 15 illustrates an example of yet another report 1500 that may be produced by the report generator 308 for an IR graph. Report 1500 provides information regarding the size of buffers that are needed at various points in the IR graph, and a relative memory access bandwidth for the buffers. Specifically, report 1500, which may be in the form of a table having a plurality of rows 1501*a-d* and columns, includes a buffer number column 1502, which specifies a particular buffer, e.g., by number, such as 1, 2, 3, etc. Report 1500 also includes a buffer size column 1504 that specifies the size of the respective buffer, e.g., in terms of the block size, such as 8×8, 16×16, etc. A number of loop iterations column 1506 indicates how many times the respective buffer is iterated. A memory access bandwidth column 1508 provides a relative indication of bandwidth requirements for the respective buffer. For example, suppose the size of each element in the buffers is one byte. Then, for buffer number one, i.e., row 1501*a*, the report generator 308 determines the respective memory access bandwidth by multiplying the buffer size by the buffer element size, and then multiplying this value by the number of loop iterations, i.e., 8×8*1-byte*8 iterations=512. In addition, the report generator 308 may sum up the buffer sizes to provide a total memory access count and the memory access bandwidths to provide a total memory access bandwidth, as illustrated at 1510 and 1512, respectively.

By reviewing report 1500, a developer can quickly see how many buffers are required and their sizes. The developer can also see the memory access bandwidth for the buffers, and the total size of the buffers. In many cases, memory access bandwidth can have a profound influence on performance. Accordingly, if report 1500 shows one or more buffers with a high memory access bandwidth, such as buffer number 2, row 1501*b*, the developer may consider repeating the process with different, typically larger, block size choices in order to reduce the memory access bandwidth and thus improve performance.

Figure 16:
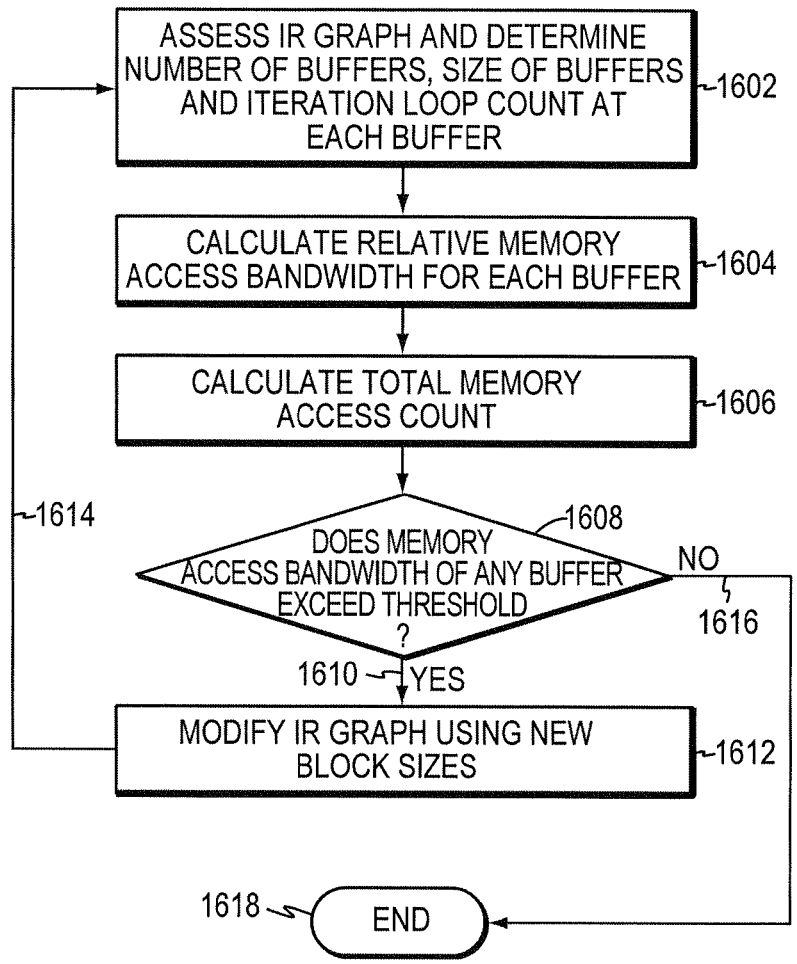
FIG. 16 is a flow diagram illustrating example processing steps that may be used to reduce or minimize memory access bandwidth.

FIG. 16 is a flow diagram of exemplary processing steps that may be used to reduce or minimize memory access bandwidth. After generating an IR graph as discussed above, the IR customizer 306 assesses the IR graph, and determines the number of buffers, the size of the buffers, and the iteration loop count at each buffer, as indicated at step 1602. For each buffer, the IR customizer 306 calculates the relative memory access bandwidth, as indicated at step 1604, and the total memory access count, as indicated at step 1606. In one embodiment, the IR customizer 306 then determines whether the memory access bandwidth at any of the buffers exceeds a threshold, as indicated at step 1608. The threshold may be a predetermined value or it may be settable by the developer, e.g., through a user interface. If the memory access bandwidth for one or more buffers exceeds the threshold, the IR customizer 306 illustratively computes a new loop schedule for the IR graph using new block size choices for one or more nodes of the IR graph, as indicated by the "Yes" arrow 1610 leading to step 1612. In an embodiment, the IR customizer 306 chooses larger block sizes for one or more of the nodes. Alternatively, the developer may choose the new block sizes. Processing then returns to step 1602, as indicated by arrow 1614. Steps 1602-1612 may be repeated until the memory access bandwidth for each buffer is below the threshold, as indicated by the "No" arrow 1616 leading to step 1618. The sequence ends at step 1618.

In an embodiment, the IR customizer 306 may compare a total memory access bandwidth value calculated for all of the buffers to a corresponding total threshold to determine whether the process should be repeated with one or more new block sizes. In a further embodiment, the IR customizer 306 may omit comparing the memory bandwidth access values to a threshold and, instead, produce several IR graphs using different block size selections chosen by the IR customizer 306 and/or by the developer. The buffer sizes and memory access bandwidth values for these different IR graphs may then be presented to the developer by the report facility 308, e.g., in a form similar to report 1500. The developer may then review these reports and select one of the IR graphs for code generation.

In an embodiment, the report facility 308 may be configured to generate a new or updated graphical model of the input code based on the modified IR. This updated graphical model could then be displayed to the developer for evaluation. A suitable mechanism for generating a new or updated graphical model from a modified IR is described in U.S. Patent Publication No. 2007/0067761A1, entitled System and Method for Transforming Graphical Models, which is hereby incorporated by reference in its entirety.

For example, if the source language of the input code is a graphical model, a new graphical model, which may be operated upon, e.g., edited, run, etc., by the developer, may be generated. This new graphical model represents the block-processing modifications performed on the source graphical model. This new graphical model may be further modified by the developer. If the source is a textual program, a new textual program may be generated that incorporates the modifications.

In an embodiment, a functional element may change its available block size(s), its preferred block size or its preferred data organization based on one or more parameters received by the functional element as part of the input code 226. For example, graphical block 412 (FIG. 4) of model 400 may receive a parameter from an upstream graphical block, e.g., graphical block 406. The functional element represented by graphical block 412, moreover, may be configured to utilize this received parameter to compute or reset its available and/or preferred block size(s). For example, given an input data matrix that contains real-valued elements, a first functional element may propose a preferred block size of 8×8 elements, due to a 64-element limit of a hardware cache line. However, upon a subsequent change to the model, a second and upstream functional element now produces complex data values which are input to the first functional element. Complex data elements require twice the total storage area as compared to real valued data elements. The first functional element thus determines that a 4×4 or a 4×8 block size is more appropriate, to remain within the size of the hardware cache line.

In an embodiment, the invention relates to a compiler provided with an API for communicating with the functional elements of a computational system. The functional elements are configured with a single block size (such as a preferred block size), multiple distinct block sizes (such as available block sizes, a finite range of sizes, an infinite range of sizes, and/or a preferred data order. The compiler utilizes the API to obtain the block sizes of the functional elements of the input code, and chooses a block size for each functional element based, at least in part, on the one or more criteria that have been specified. The compiler also builds one or more IRs, which may be a connected graph of nodes, from the input code. The compiler groups or clusters various sets of the IR nodes based on the block sizes, and derives a node visitation pattern. The IR is transformed using "FOR" loops and/or repetitive execution, fragmentation and reassembly. The final result of the compilation process are simulation, code generation, reports, and/or new computational systems or models.

The foregoing description has been directed to specific embodiments of the present invention. It will be apparent, however, that other variations and modifications may be made to the described embodiments, with the attainment of some or all of their advantages. For example, a project developer may obtain input code developed by others and provide that code to the code generator of the present invention together with one or more goals and one or more constraints, if any, depending on the system being implemented.

Therefore, it is the object of the appended claims to cover all such variations and modifications as come within the true spirit and scope of the invention.

What is claimed is:

1. A method comprising:
receiving input code having a plurality of functional elements that process data elements;
building, by a processing element, a first intermediate representation of the input code, the first intermediate representation having a plurality of nodes that represent the functional elements, the plurality of nodes having available block sizes, the available block sizes representing different dimensions of arrays of data elements that the plurality of nodes are capable of processing, one of the arrays of data elements includes two or more dimensions;
assigning, to the plurality of nodes of the first intermediate representation, selected block sizes from the available block sizes; and
modifying, by the processing element, the first intermediate representation to create a second intermediate representation that
organizes at least some of the nodes of the first intermediate representation that have the same selected block size into a group, and
includes one or more of
fragmentation code appearing before the group in a processing order,
reassembly code appearing after the group in the processing order, and
a loop structure for the group.

2. The method of claim 1, further comprising:
generating output code from the second intermediate representation.

3. The method of claim 1, further comprising:
generating a report describing one or more modifications made to the first intermediate representation.

4. The method of claim 1, wherein the selected block sizes are specified by a user.

5. The method of claim 1, further comprising:
choosing the selected block sizes based on a criterion, wherein the criterion includes:
increasing execution speed, or
reducing memory requirements.

6. The method of claim 1, wherein the available block sizes include a preferred block size that can be processed most efficiently by the respective node.

7. The method of claim 1, wherein the input code specifies an image processing procedure, the data elements correspond to an image, and the available block sizes correspond to a number of rows and columns of pixels of the image.

8. A non-transitory computer readable medium comprising program instructions, the program instructions, when executed by a processor, operable to:
store, in a memory, a first intermediate representation, the first intermediate representation having a plurality of nodes that represent functional elements, the functional elements having available block sizes, the available block sizes representing different dimensions of arrays of data elements that the functional elements are capable of processing, one of the arrays of data elements includes two or more dimensions;
obtain, for the nodes of the first intermediate representation, selected block sizes from the available block sizes; and
modify, using the processor, the first intermediate representation to create a second intermediate representation that
organizes at least some of the nodes of the first intermediate representation that have the same selected block size into a group, and
includes one or more of
fragmentation code appearing before the group in a processing order, reassembly code appearing after the group in the processing order, and a loop structure for the group.

9. The non-transitory computer readable medium of claim 8, wherein the program instructions, when executed by the processor, are further operable to:
generate a model from the second intermediate representation; and
present the model at an output device.

10. The non-transitory computer readable medium of claim 8, wherein the program instructions, when executed by the processor, are further to:
generate output code from the second intermediate representation.

11. A system comprising:
a memory storing input code having a plurality of functional elements that process data elements; and
a processor coupled to the memory, the processor configured to:
build a first intermediate representation of the input code, the first intermediate representation having a plurality of nodes that represent the functional elements, the plurality of nodes having available block sizes, the available block sizes representing different dimensions of arrays of data elements that the plurality of nodes are capable of processing, one of the arrays of data elements includes two or more dimensions;
assign, to the plurality of nodes of the first intermediate representation, selected block sizes from the available block sizes; and
modify the first intermediate representation to create a second intermediate representation that
organizes at least some of the nodes of the first intermediate representation that have the same selected block size into a group, and
includes one or more of
fragmentation code appearing before the group in a processing order,
reassembly code appearing after the group in the processing order, and
a loop structure for the group.

12. The system of claim 11, wherein the processor is further configured to:
choose the selected block sizes based on a criterion.

13. An apparatus comprising:
a memory storing input code having a plurality of functional elements; and a processor coupled to the memory, the processor configured to:
build an intermediate representation of the input code;
retrieve one or more block size parameters of the plurality of functional elements indicating a size of blocks of data elements for processing by the plurality of functional elements, the block size parameters obtained from the plurality of functional elements of the input code;
assign the one or more block size parameters of the plurality of functional elements to nodes of the intermediate representation that map to the functional elements;
modify the intermediate representation, based on the one or more block size parameters, to satisfy one or more user-defined criteria; and
generate output code from the modified intermediate representation.

14. The apparatus of claim 13 wherein the intermediate representation is one of a control flow graph, a data flow graph, and a control/data flow graph.

15. The apparatus of claim 13 wherein the output code is executable by one of a general-purpose processor, a Digital Signal Processor (DSP) a Field Programmable Gate Array (FPGA), or Complex Programmable Logic Device (CPLD).

* * * * *

UNITED STATES PATENT AND TRADEMARK OFFICE
CERTIFICATE OF CORRECTION

PATENT NO.           : 9,009,690 B1
APPLICATION NO.      : 13/742231
DATED                : April 14, 2015
INVENTOR(S)          : Donald P. Orofino, II et al.

Page 1 of 1

It is certified that error appears in the above-identified patent and that said Letters Patent is hereby corrected as shown below:

In the Specification:
Col. 2, line 48:
Delete "and schedules ing the IR graph so that it achieves the criteria,"
Insert --and scheduling the IR graph so that it achieves the criteria,--

Col. 4, line 9:
Delete "preferably written in a highlevel language, such as the MAT-"
Insert --preferably written in a high-level language, such as the MAT- --

Col. 6, line 10:
Delete "tional element may be fully determined by the comas piler or"
Insert --tional element may be fully determined by the compiler or--

Col. 6, line 20:
Delete "elements, based on one or more compiletime characteristics"
Insert --elements, based on one or more compile-time characteristics--

Col. 10, line 27:
Delete "elements cores responding to the respective nodes. The IR"
Insert --elements corresponding to the respective nodes. The IR--

Col. 11, line 16:
Delete "element(s). Each subblock of the larger block is visited"
Insert --element(s). Each sub-block of the larger block is visited--

Signed and Sealed this
Twelfth Day of July, 2016

Michelle K. Lee
*Director of the United States Patent and Trademark Office*